United States Patent
Keestra et al.

(10) Patent No.: US 11,046,023 B2
(45) Date of Patent: Jun. 29, 2021

(54) TAPES

(71) Applicant: DSM IP ASSETS B.V., Heerlen (NL)

(72) Inventors: Beert Jacobus Keestra, Echt (NL); Tim Leonardus Maria Vorage, Echt (NL); Godefridus Bernardus Wilhelmus Leonardus Ligthart, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 36 days.

(21) Appl. No.: 16/062,233

(22) PCT Filed: Dec. 2, 2016

(86) PCT No.: PCT/EP2016/079601
§ 371 (c)(1),
(2) Date: Jun. 14, 2018

(87) PCT Pub. No.: WO2017/102381
PCT Pub. Date: Jun. 22, 2017

(65) Prior Publication Data
US 2018/0370157 A1    Dec. 27, 2018

(30) Foreign Application Priority Data
Dec. 18, 2015  (EP) ..................................... 15201406

(51) Int. Cl.
*B29C 70/16*       (2006.01)
*B29C 53/56*       (2006.01)
*B29C 53/58*       (2006.01)
*B29C 53/82*       (2006.01)
*F17C 1/02*        (2006.01)
*B29C 53/60*       (2006.01)

(52) U.S. Cl.
CPC ............ *B29C 70/16* (2013.01); *B29C 53/566* (2013.01); *B29C 53/581* (2013.01); *B29C 53/60* (2013.01); *B29C 53/824* (2013.01); *F17C 1/02* (2013.01); *F17C 2203/0675* (2013.01)

(58) Field of Classification Search
CPC .................................................... B29C 53/56
See application file for complete search history.

(56) References Cited

U.S. PATENT DOCUMENTS

| | | |
|---|---|---|
| 2013/0105501 A1 | 5/2013 | Vanswijgenhoven et al. |
| 2014/0034654 A1 | 2/2014 | Dullaert et al. |
| 2014/0170353 A1 | 6/2014 | Kreager et al. |
| 2014/0272227 A1 | 9/2014 | Jeltsch et al. |

FOREIGN PATENT DOCUMENTS

| | | | |
|---|---|---|---|
| JP | 2014-173006 | 9/2014 | |
| WO | WO-0009586 A1 * | 2/2000 | ............ C08G 69/28 |
| WO | 2014/040871 | 3/2014 | |

OTHER PUBLICATIONS

International Search Report and Written Opinion of the ISA for PCT/EP2016/079610, dated Feb. 23, 2017, 6 pages.
DSM "Automobile natural gas tanks take the pressure with composites in DSM high performance thermoplastics" Oct. 30, 2014, XP055261321, 2 pages.

* cited by examiner

*Primary Examiner* — Ian A Rummel
(74) *Attorney, Agent, or Firm* — Nixon & Vanderhye P.C.

(57) ABSTRACT

The invention relates to a tape, comprising at least one layer comprising a. endless fiber in an total amount of at least 40 volume % as compared to the total volume of the layer and b. a thermoplastic matrix comprising one or more polyamides containing one or more aliphatic monomeric units, c. and optionally heat stabilizer, flame retardant, colorant, lubricant, mold release agent, UV stabilizer, impact modifier, laser absorbing additive as well as combinations thereof; wherein the one or more polyamides have a CH2-ratio of at least 5.5 and less than 10, calculated by— identifying the number of different aliphatic monomeric units in the one or more polyamides; —determining the number of CH2 groups per aliphatic monomeric unit for each of these different aliphatic monomeric units; —calculating the sum of the so determined numbers of CH2 groups; —dividing said sum by the number of different aliphatic monomeric units in the one or more polyamides; taking into account only the aliphatic monomeric units present in the one or more polyamides in an amount of at least 10 wt % with respect to the total weight of the one or more polyamides. The invention also relates to a vessel prepared by employing these tapes.

22 Claims, No Drawings

TAPES

This application is the U.S. national phase of International Application No. PCT/EP2016/079601 filed Dec. 2, 2016, which designated the U.S. and claims priority to EP Patent Application No. 15201406.4 filed Dec. 18, 2015, and EP Patent Application No. 16180547.8 filed Jul. 21, 2016, the entire contents of each of which are hereby incorporated by reference.

This invention relates to tapes comprising endless fibers and a thermoplastic matrix, as well as applications thereof, such as pressure vessels and a method for preparing a vessel employing the tape.

Tapes, also referred to as bands and laminates, are known and are for example described in US2014/272227. This disclosure describes a method for production of laminates in which endless fibers are employed together with a list of thermoplastic materials. A disadvantage of these laminates is that it may suffer from exposure to acids, which may lead to failure of the product. Especially in pressure vessels, in which gasses and/or liquids are contained, this property is essential. Pressure vessels need to be safe during the whole life time of the product and may not fail due to exposure to for example acidic media, such as battery acids, acidic rain, etc.

It is thus an object of the present invention to provide tapes, which exhibit a higher resistance against acids as compared to those in the prior art. Surprisingly, a tape, comprising at least one layer comprising
 a. endless fiber in an total amount of at least 40 volume % as compared to the total volume of the layer and
 b. a thermoplastic matrix comprising one or more polyamides containing one or more aliphatic monomeric units,
 c. and optionally heat stabilizer, flame retardant, colorant, lubricant, mold release agent, UV stabilizer, impact modifier, laser absorbing additive as well as combinations thereof;
wherein the one or more polyamides have a CH2-ratio of at least 5.5 and less than 10, calculated by
 identifying the number of different aliphatic monomeric units in the one or more polyamides;
 determining the number of CH2 groups per aliphatic monomeric unit for each of these different aliphatic monomeric units;
 calculating the sum of the so determined numbers of CH2 groups;
 dividing said sum by the number of different aliphatic monomeric units in the one or more polyamides;
taking into account only the aliphatic monomeric units present in the one or more polyamides in an amount of at least 10 wt % with respect to the total weight of the one or more polyamides, exhibits higher acid resistance, as evidenced by experiments as shown below. Surprisingly, the tape according to the invention exhibits higher resistance to acids as compared to tapes comprising general polyamides, such as PA-6 and PA-66. The tape may be advantageously employed in pressure vessels, as this results in a pressure vessel which combines high mechanical properties with a higher acid resistance. The tape according to the invention exhibits a higher burst pressure when for example employed in a vessel, and allows recycling into prime applications.

Tape

With tape herein is understood an elongated body having a longitudinal direction, a width, a thickness and a cross-sectional aspect ratio, i.e. the ratio of thickness to width. Said cross-section is defined as substantially perpendicular to the longitudinal direction of the tape. The longitudinal direction or machine direction of the tape essentially corresponds to the orientation of the endless fibers. The length dimension of a tape of the invention is not particularly limited. The length may exceed 10 km and mainly depends on the endless fibres and the process used to produce the tape. Nevertheless said tape can for convenience reasons be manufactured to smaller sizes, according to the requirements of the envisioned applications.

The tape according to the invention may have a thickness of between 100 micrometer and may be as thick as 1000 micrometer. If used for applications in which wrapping of a tape is employed, the thickness is preferably between 100 micrometer and 500 micrometer as thicker tapes are more difficult to wrap.

By width is herein understood the largest dimension between two points on the perimeter of a cross-section of the tape, said cross-section being orthogonal to the length of the tape. By thickness is herein understood a distance between two points on the perimeter of said cross-section, said distance being perpendicular on the width of the tape. The width and the thickness of a tape can be measured according to known methods in the art, e.g. with the help of a ruler and a microscope or a micrometer, respectively.

The tape according to the invention comprises at least one layer and may thus be a single layer or two layers or even more layers If a tape has more than one layer it is also referred to as multi-layer. If the tape is a multi-layer, the tape may comprise further layers such as aluminum, polymer compositions such as polyamides and EVOH. The tape may also comprise a further layer not comprising endless fiber. Preferably, the tape consists of one layer as this facilitates preparation of the tape.

Surprisingly, the tape according to the invention exhibits higher acid resistance in combination with a lower creep. This is advantageous for applications which require high structural integrity and are prone to exposure to acids, such as vessels for use in automotive industry.

Surprisingly, the tape according to the invention shows good flexural strength.

The thickness of the tape is usually between 10 micro meter to 1 mm. Tapes with thicker thicknesses are difficult to handle, and thinner tapes are difficult to produce as the endless fiber also has a certain diameter. Preferably the thickness of the tape is between 50 to 500 micron and more preferably between 100 and 300 micrometer and even more preferred between 150 to 250 micron.

The width of the tape is usually between 5 mm and 10.0 cm, preferably between 1 cm and 8 cm, more preferably between 2 cm and 6 cm. If a tape has a low width, it needs more wrappings and is therefore energy and time consuming. If the tape has a very large width, bigger areas can be covered in one winding step, but winding on curved surfaces is more difficult and results in inefficiencies.

The tape according to the invention may be prepared by the following method: endless fibers are provided and spread and fed to a melt of the thermoplastic matrix and subsequently cooled to form a tape.

With thermoplastic matrix is herein understood to comprise at least one or more polyamides, but may also comprise other thermoplastic polymers and optionally other additives. The matrix also may consist of one or more polyamides.

Endless fiber is herein understood to refer to at least one endless fiber, and may also refer to more fibers.

Polyamide

The tape according to the invention comprises at least one layer comprising a thermoplastic matrix comprising one or more polyamides containing one or more aliphatic monomeric units, wherein the one or more polyamides have a CH2-ratio of at least 5.5 and less than 10, calculated by
   identifying the number of different aliphatic monomeric units in the one or more polyamides;
   determining the number of CH2 groups per aliphatic monomeric unit for each of these different aliphatic monomeric units;
   calculating the sum of the so determined numbers of CH2 groups;
   dividing said sum by the number of different aliphatic monomeric units in the one or more polyamides;
   taking into account only the aliphatic monomeric units present in the one or more polyamides in an amount of at least 10 wt % with respect to the total weight of the one or more polyamides.

Monomeric units derived from aliphatic monomers which are present in the one or more polyamides in an amount of less than 10 wt %, are not taken into account for the CH2-ratio, as these are considered not to contribute towards structural integrity of the tape. Non-aliphatic monomeric units are also not taken into account for determining the CH2-ratio.

For convenience, in table 1 a list is provided of common polyamides and their CH2-ratio.

TABLE 1

Polyamides and their CH2-ratio

| Name of polyamide | Sum of CH2 groups in aliphatic monomeric units > 10 wt % in the one or more polyamides | number of aliphatic monomeric units | CH2 ratio |
| --- | --- | --- | --- |
| PA-6 | 5 | 1 | 5 |
| PA-66 | 6 + 4 | 2 | 5 |
| PA-410 | 4 + 8 | 2 | 6 |
| PA-610 | 6 + 8 | 2 | 7 |
| PA-510 | 5 + 8 | 2 | 6.5 |
| PA-612 | 6 + 10 | 2 | 8 |
| PA-6T | 6 | 1 | 6 |
| PA-9T | 9 | 1 | 9 |
| PA-10T | 10 | 1 | 10 |
| PA-11 | 10 | 1 | 10 |
| PA-12 | 11 | 1 | 11 |
| PA-612/9T, in which 9T is present in an amount of less than 10 wt % | 6 + 10 | 2 | 8 |
| PA-612/9T, in which 9T is present in an amount of more than 10 wt % | 6 + 10 + 9 | 3 | 8.3 |
| PA-410/PA-6 50/50 wt % blend | 4 + 8 + 5 | 3 | 5.7 |
| PA-410/PA-6 95/5 wt % blend | 4 + 8 | 2 | 6 |

The polyamides are noted as described in Nylon Plastics Handbook, Melvin I. Kohan, Hanser Publishers, 1995, page 5. PA-6 is polycaprolactam, in which the monomeric units are derived from caprolactam. PA-66 is poly(hexamethylene adipamide) in which the monomeric units are derived from hexamethylene diamine and adipic acid.

PA-6/PA-66 refers to a blend of PA-6 and PA-66, whereas PA-6/66 refers to a copolyamide. PA-410 is a polyamide in which the monomeric units are derived from 1,4-diaminobutane and sebacic acid.

For determining a monomeric unit, the weight of a monomeric unit is defined for a monomeric unit derived from a diamine as the part —NH—X—NH— in which X denotes the part between the diamine groups. The weight of a monomeric unit derived from a diacid is the part —C(O)—X—C(O)—, in which X denotes the part between the acid groups. For a monomeric unit derived from an aminoacid or a lactam, the monomeric unit is defined as —NH—X—C(O)—, wherein X denotes the part between the amine and acid group. The split between the monomeric units is thus always a the C—N bond of the amide group The upper limit of the CH2-ratio is less than 10, as this provides additional stiffness as compared to polyamides having a higher CH2-ratio. Preferably, the CH2-ratio is between 5.6 and 9.5 and more preferably between 5.7 and 8.5, as these polyamides provide the optimum of properties including barrier properties and structural integrity and acid resistance.

Preferably, the polyamide is a homopolyamide in contrast to a copolyamide or blend. Homopolyamide is herein defined as a polyamide which consists of monomeric unit derived from an aminoacid, or which consists of monomeric units derived from one type of diamine and one type of diacid. Homopolyamides are referred to as either PA-X, in which X is a monomeric unit derived from one type of aminoacid, or PA-XY, in which X is a monomeric unit derived from one type of diamine and Y is a monomeric unit derived from one type of aminoacid. Employing homopolyamides has the advantage that the tape can be more easily prepared as preparation of a homopolyamide may be easier than a copolyamide or blend. Also recycling of the tape is easier as compared to a tape made with a copolyamide or blend. Blends and copolyamides may have the disadvantage that there may be no distinct melting temperature, which makes it more difficult to process. Also degradation may be observed more often for blends and copolyamides, which is undesirable.

Even more preferred the polyamide is a homopolyamide having a CH2-ratio of between 5.7 and 8.5, such as PA-410, PA-510, PA-412, PA512, PA-610, PA-612, as this combines easy preparation of the polyamide and sufficient heat deflection temperature (HDT) and low moisture uptake and sufficient chemical resistance and recycling of the tape.

Suitable polyamides having a CH2-ratio of at least 5.5 and less than 10 include PA-410, PA-510, PA-412, PA512, PA-610, PA-612, PA-1010, including blends and copolyamides thereof, as well as including a minority of non-aliphatic monomeric units.

Preferably, the one or more polyamides having a CH2-ratio of at least 5.5 comprises PA-410, as tapes comprising PA-410 show a higher modulus and higher strength and thus allowing for thinner walls, weight reduction or stronger tanks at same weight. This results in a higher safety standard when employed in tanks. Preferably, the tape comprising at least one layer comprising
   a. endless fiber in an total amount of at least 40 volume % as compared to the total volume of the layer and
   b. a thermoplastic matrix comprising at least 40 wt % PA-410 with respect to the total weight of the thermoplastic matrix,
   c. and optionally heat stabilizer, flame retardant, colorant, lubricant, mold release agent, UV stabilizer, impact modifier, laser absorbing additive as well as combinations thereof.

More preferably the thermoplastic matrix comprises at least 50 wt % of PA-410 with respect to the total amount of thermoplastic matrix, more preferably at least 60 wt % and even more preferred at least 70 wt % PA-410.

The amount and type of monomeric units may be determined by NMR spectroscopy.

Endless Fiber

The tape according to the invention comprises endless fiber. Endless fiber as such is known in the art and also referred to as continuous fiber and is herein understood to have an aspect ratio of at least 500. For example, the endless fiber in the tape may have a length of several hundreds of metres.

The endless fiber present in the tape according to the invention may be chosen from the group consisting of glass fiber, carbon fiber, aramid fiber, and combinations thereof. Preferably, the endless fiber has a sizing in order to improve adhesion between the fiber and the polyamide.

The volume % of the endless fiber in the layer of the tape usually lies between 10 and 65 volume % as compared to the total volume of the layer, preferably the volume percentage is between 20 and 55 vol %, more preferably the volume percentage is between 30 and 55 vol %. It is usually desirable to have a volume percentage of endless fiber as high as possible, as this contributes to the strength of the tape.

Other Ingredients

The thermoplastic matrix of the at least one layer of the tape optionally comprises any of the following ingredients such as heat stabilizer, flame retardant, colorant, lubricant, mold release agent, UV stabilizer, impact modifier, nucleating agent, nigrosine, laser absorbing additives and combinations thereof. These ingredients are known to a person skilled in the art and are usually present in minor amounts such as for example between 0.001 wt % and 10 wt % with respect to the total weight of the thermoplastic matrix.

Preferably, the thermoplastic matrix comprises heat stabilizers, chosen from the group of inorganic stabilizers, organic stabilizers comprising a primary antioxidant group, organic stabilizers comprising a hindered amine group and combinations thereof. Preferably, the heat stabilizers are present in an amount of between 0.01 wt % and 8 wt % with respect to the total weight of the thermoplastic matrix in the layer. Inorganic stabilizers are known and are for example a copper compound and a salt containing a halogenide acid group, for example an iodide or a bromide salt. Good examples of suitable copper compounds include copper (I) halogenides, preferably copper iodide (CuI) and further copper salts like for instance copper acetate, copper sulfate and cupper stearate. As the salt containing an halogenide acid group preferably potassium bromide (KBr) of potassium iodide (KI) are used. Most preferred a combination of copper iodide and potassium bromide (CuI/KBr) is used. Organic stabilizers comprising a primary antioxidant group are radical scavengers such as for example phenolic antioxidants as well as aromatic amines, and are known as such. Suitable organic stabilisers comprising a hindered amine (also known as Hindered Amine Stabilizer; HAS) in the tape according to the invention are for example HAS compounds derived from a substituted piperidine compound, in particular any compound which is derived from an alkyl-substituted piperidinyl or piperazinone compound, and substituted alkoxy peridinyl compounds. More preferably, the thermoplastic matrix comprises a combination of heat stabilizer in which an inorganic stabilizer is employed in combination with an organic stabilizer comprising both a hindered amine group and an organic stabilizer comprising a primary antioxidant. The combination of these 3 stabilizers provides an improved UV stability.

Applications

The invention also relates to applications in which the tape is employed for preparing the application, such as vessels, pipes, sheet material, local reinforcement.

The invention also relates to a process for preparing a vessel comprising the following steps:
 a. Providing a support;
 b. providing a tape as disclosed above;
 c. Wrapping the tape around the support while consolidating the tape by heat, thereby creating a hollow body;
 d. Cooling the hollow body to become solid.

When a tape according to the invention is employed, vessels may be obtained which exhibit high burst pressure. These vessels may exhibit a burst pressure of at least 25 bar, which is usually required for vessels containing liquefied petroleum gas (LPG) or air or water, or nitrogen or oxygen. Surprisingly, the vessel may exhibit a burst pressure of at least 300 bar, which is for example required for vessels containing compressed natural gas (CNG). For hydrogen vessels a burst pressure of at least 1500 bar may be reached with a vessel according to the invention. Burst pressure is measured according to the hydrostatic pressure burst test as described in ECE R110. Surprisingly, these vessels may pass the Bonfire test.

The tape may be employed in a process as disclosed in US2013105501, thus by wrapping the tape around a mandrel and applying heat to consolidate the tapes and subsequent cooling. US2013105501 is hereby incorporated by reference. The tape may also be employed by a so-called laser method, which is for example disclosed in WO14040871A1. If a laser method is employed, the tape may need the presence of a laser absorbing additive in order to produce heat from the laser. Laser absorbing additives are known to a person skilled in the art and include for example carbon black. Other examples of laser light absorbers include oxides, hydroxides, sulphides, sulphates and phosphates of metals such as copper, coated bismuth, tin, aluminum, zinc, silver, titanium, antimony, manganese, iron, nickel and chromium, laser light absorbing (in)organic dyes or metal oxide coated flakes. Preferably the laser light absorbers are chosen from antimony trioxide, tin dioxide, barium titanate, titanium dioxide, aluminum oxide, copper-hydroxy-phosphate, copper-ortho-phosphate, copper-hydroxide, antimony-tin oxide, anthraquinone or azo dyes.

The support may be a mandrel, as disclosed in the process of US2013105501, or a liner prepared by for example as disclosed above, inflatable balloon, inert filler such as sand or talcum. The support may thus become part of the hollow body or may be taken out after production of the hollow body. If the support is a mandrel, the mandrel may be removed after step d.

Optionally, before step c) another material may be wrapped around the support for example to increase barrier properties to form a liner, as disclosed above. This material may comprise from for example EVOH, PA-6, PA-66, PA-410, PA-610, PA-612, PA-6T/6I, metal or combinations thereof. This is in particular beneficial if the support will not become part of the vessel. The other material may then be employed to increase barrier properties. Preferably, the other material before step c) is chosen from PA-6, PA-410, as these materials have a good barrier performance and recyclability.

Consolidation is performed preferably by heat, such as provided by a laser, as for example an infrared laser, or heating elements such as an oven.

EXAMPLES

Measurements were performed on various thermoplastic matrices in order to show their suitability for use in tapes.

Various homopolyamides with various CH2-ratios were tested. Results are given in Table 2.

Acid resistance test: 15 Izod bars with the polyamides as described in Table 2, were exposed to a solution of 30% H2SO4 in a petri-dish. The level of liquid was 2 mm so that the 4 mm thick bars were immersed on one side only. Separate petri-dishes were used for every take-out time (25, 50 and 100 hrs). After immersion, the bars were washed with an excess of water taking care that the upper half did not come in contact with the strong acid. After washing, the bars were dried with paper. Flexural test according to ISO178: the acid treated surface faced downward during the flexural test (non-exposed side facing up-wards).

Table 2 clearly indicates that polyamides with a CH2-ratio between 5.5 and less than 10, exhibited a combination of high acid resistance and good structural integrity. A good structural integrity is observed when the flex modulus is sufficient high in combination with a higher HDT. Examples 1 to 4 all exhibited a sufficient high flex modulus in combination with a high HDT, which makes them good candidates to be employed in a vessel according to the invention.

The most preferred polyamide being PA-410, example 1, clearly combines a high flex modulus with high HDT, which surprisingly when employed in a tape, showed a very stable long term structural integrity.

A hollow body was prepared by wrapping a tape comprising PA-6. Subsequently a tape according to the invention, comprising 65 wt % endless glass fibers and 35 wt % PA-410 was wrapped, based on the total weight of the tape around a mandrel while using heat to consolidate these wrappings. The vessel was created by attaching bosses to the hollow body, as known in the prior art. The vessel was filled with natural gas and the vessel was subjected to the Bonfire test. This test is described in ECE R110. In short, during Bonfire test, a vessel while containing gas, is subjected to 850° C. at the outside of the vessel. A vessel passes the test if the vessel does not explode, but the vessel vents the contained gas through a pressure relief device. Surprisingly, the vessel produced with a tape according to the invention, passed the Bonfire test, even though the melting temperature of PA-410 is 248° C., thus substantially lower than the heat the vessel was subjected to. This is a major achievement as this vessel allows for thermoplastic composite pressure vessels which can contain high amounts of gasses or liquids while maintaining a high safety standard and after the life time the vessel may be recycled into prime applications, which was not possible for thermoset tanks.

Surprisingly, the employment of homopolyamides provides a tape which combines high acid resistance and sufficient flex modulus in combination with a higher HDT.

TABLE 2

Various polyamides and results

|  | ISO | comparative example A PA-6 | comparative example B PA-66 | example 1 PA-410 | example 2 PA-610 | example 3 PA-612 | example 4 PA-1010 | comparative example C PA-11 | comparative example D PA-12 |
|---|---|---|---|---|---|---|---|---|---|
| CH2-ratio |  | 5 | 5 | 6 | 7 | 8 | 9 | 10 | 11 |
| flex modulus (GPa) | ISO178 | 2.84 | 2.94 | 2.7 | 2.05 | 2.38 | 1.74 |  | 1.31 |
| permeability CNG @25 C. (cm3 · mm/m2/day/bar) |  | 0.1 |  |  |  |  |  | 0.6 |  |
| permeability H2 @20° C. (mol/m/s/Pa) |  | 1.1E−16 |  |  |  |  |  | 6.7E−16 |  |
| flex modulus after 100 hrs acid exposure (GPa) |  | 0.84 | 0.88 | 2.02 | 1.35 | 1.89 |  |  |  |
| retention after H2SO4 exposure (%) |  | 29.8 | 29.9 | 74.5 | 65.9 | 79.2 |  |  |  |
| HDT 0.45 MPa | ISO-R-75 method B | 150 | 215 | 175 | 140 | 135 | 110 | 145 | 135 |
| HDT 1.8 MPa | ISO-R-75 method A | 50 | 75 | 75 | 55 | 62 | 50 | 50 | 55 |
| Melting temperature (° C.) |  | 222 | 262 | 248 | 222 | 218 | 202 | 189 | 179 |

The invention claimed is:

1. A tape which includes at least one layer comprising:
   (a) endless fiber in a total amount of at least 40 volume % as compared to the total volume of the layer and
   (b) a thermoplastic matrix comprising one or more polyamides containing one or more aliphatic monomeric units, and
   (c) optionally at least one component selected from the group consisting of heat stabilizers, flame retardants, colorants, lubricants, mold release agents, UV stabilizers, impact modifiers, laser absorbing additives and combinations thereof; wherein
   the one or more polyamides have a CH2-ratio of at least 5.5 and less than 10, calculated by the steps of:
   (i) identifying the number of different aliphatic monomeric units in the one or more polyamides;
   (ii) determining the number of CH2 groups per aliphatic monomeric unit for each of these different aliphatic monomeric units;
   (iii) calculating the sum of the so determined numbers of CH2 groups; and
   (iv) dividing said sum by the number of different aliphatic monomeric units in the one or more polyamides;
   taking into account only the aliphatic monomeric units present in the one or more polyamides in an amount of at least 10 wt % with respect to the total weight of the one or more polyamides, wherein
   the tape exhibits a high flexural modulus retention of 65.9% or more after 100 hours exposure to a solution of 30% $H_2SO_4$, wherein the flexural modulus is determined according to ISO 178.

2. The tape according to claim 1, wherein the endless fiber is selected from the group consisting of glass fiber, carbon fiber, aramid fiber and combinations thereof.

3. The tape according to claim 1, wherein the one or more polyamides is selected from the group consisting of PA-410, PA-510, PA-412, PA-512, PA-610, PA-612, PA-1010, as well as blends and copolyamides thereof.

4. The tape according to claim 1, wherein the amount of endless fiber is between 40 and 65 volume % as compared to the total volume of the layer.

5. The tape according to claim 1, wherein the tape consists of one layer.

6. The tape according to claim 1, wherein the tape comprises an additional layer which does not comprise endless fiber, wherein the additional layer is formed of at least one material selected from the group consisting of EVOH, PA-6, PA-66, PA-410, PA-6T/6I and copolyamides thereof.

7. The tape according to claim 1, wherein the tape has a thickness between 50 to 500 micron.

8. The tape according to claim 1, wherein the tape has a width between 5 mm and 10.0 cm.

9. The tape according to claim 1, wherein the polyamide is a homopolyamide selected from the group consisting of PA-410, PA-510, PA-412, PA512, PA-610 and PA-612.

10. The tape according to claim 1, wherein the CH2 ratio is between 5.7 and 8.5.

11. The tape according to claim 1, wherein the tape exhibits a high flexural modulus retention of 65.9% to 79.2% after 100 hours exposure to a solution of 30% $H_2SO_4$, wherein the flexural modulus is determined according to ISO 178.

12. A pressure vessel which comprises the tape according to claim 1.

13. The pressure vessel according to claim 12, wherein the pressure vessel exhibits a high burst pressure of at least 25 bar according to ECE R110.

14. The pressure vessel according to claim 12, wherein the pressure vessel exhibits a high burst pressure of at least 300 bar according to ECE R110.

15. The pressure vessel according to claim 12, wherein the pressure vessel exhibits a high burst pressure provides for high burst pressure of at least 1500 bar according to ECE R110.

16. A pipe, sheet material or local reinforcement which comprises the tape according to claim 1.

17. A pressure vessel which comprises a hollow body formed of successive wraps of a consolidated tape material, wherein the tape material comprises:
(a) endless fiber in a total amount of at least 40 volume % as compared to the total volume of the layer and
(b) a thermoplastic matrix comprising at least one polyamide containing at least one aliphatic monomeric units, wherein the at least one polyamide has a CH2-ratio of at least 5.5 and less than 10 and is selected from the group consisting of PA-410, PA-610, PA-612, PA-1010 and blends and copolyamides thereof, and
(c) optionally at least one component selected from the group consisting of heat stabilizers, flame retardants, colorants, lubricants, mold release agents, UV stabilizers, impact modifiers, laser absorbing additives and combinations thereof; wherein
the pressure vessel has a burst pressure of at least 25 bar according to ECE R110.

18. The pressure vessel according to claim 17, wherein the pressure vessel has a burst pressure of at least 300 bar according to ECE R110.

19. The pressure vessel according to claim 17, wherein the pressure vessel has a burst pressure of at least 1500 bar according to ECE R110.

20. A process for preparing a vessel comprising the following steps:
(a) providing a support;
(b) providing a tape according to claim 1;
(c) wrapping the tape around the support while consolidating the tape by heat, thereby creating a hollow body; and
(d) cooling the hollow body to become solid.

21. The process according to claim 20, wherein the support is a mandrel, and wherein the process further comprises removing the mandrel after step (d).

22. The process according to claim 20, wherein before step (c) the process comprises wrapping an additional material around the support, wherein the additional material comprises EVOH, PA-6, PA-66, PA410, PA610, PA612, metal or combinations thereof.

* * * * *